(12) United States Patent  
Gudbjornsson

(10) Patent No.: US 6,286,460 B1
(45) Date of Patent: Sep. 11, 2001

(54) SYSTEM, APPARATUS, AND METHOD FOR UNDERWATER TAGGING OF MARINE FAUNA

(75) Inventor: Sigmar Gudbjornsson, Reykjavik (IS)

(73) Assignee: Star Oddi, Reykjavik (IS)

( * ) Notice: Subject to any disclaimer, the term of this patent is extended or adjusted under 35 U.S.C. 154(b) by 0 days.

(21) Appl. No.: 09/565,479

(22) Filed: May 5, 2000

(51) Int. Cl.$^7$ ................................................. A01K 61/00
(52) U.S. Cl. .......................................... 119/200; 119/215
(58) Field of Search ................................... 119/200, 201, 119/215, 216, 219, 174, 720, 721, 859, 908; 40/300, 301

(56) References Cited

U.S. PATENT DOCUMENTS

| 2,643,481 | * | 6/1953 | Ederer | 119/216 |
|---|---|---|---|---|
| 4,198,925 | * | 4/1980 | Lindbergh | 119/216 |
| 4,392,236 | | 7/1983 | Sandstrom et al. | 452/166 |
| 4,750,490 | | 6/1988 | Haw et al. | 250/361 R |
| 4,790,090 | * | 12/1988 | Sharber | 119/215 |
| 5,321,268 | | 6/1994 | Crosby et al. | 119/215 |
| 5,324,940 | * | 6/1994 | Ekstrom | 119/215 |
| 5,372,541 | | 12/1994 | Gotchall | 119/215 |
| 6,122,699 | * | 9/2000 | Saxby et al. | 119/216 |

FOREIGN PATENT DOCUMENTS

| 0 662 617 | 7/1995 | (EP) . |
|---|---|---|
| WO 90/03070 | 3/1990 | (WO) . |
| WO 92/04703 | 3/1992 | (WO) . |

OTHER PUBLICATIONS

Gitschlag. "A Collapsible Trap For Underwater Fish Tagging"; *Bulletin of Marine Science*; V. 39(3), pp. 719–722; 1986.

Parrish and Moffitt. "Subsurface Fish Handling To Limit Decompression Effects On Deepwater Species"; *Marine Fisheries Review*; v.54(3), pp. 29–32; 1993.

Tong. "Tagging Snapper *Chrysophrys auratus* by Scuba Divers", *N.Z. Journal of Marine and Freshwater Research*; v.12(1), pp. 73–76; Mar. 1978.

Adkison, Quinn and Rutten. "An Inexpensive, Nondisruptive Method of In Situ Dart Tagging for Visual Recognition of Fish Underwater"; *North American Journal of Fisheries Management*: V. 15; pp. 507–511; 1995.

Culbertson and Peter. "Development of Tagging Techniques for Monitoring Fish Populations at Texas Artificial Reefs"; *Gulf of Mexico Science*; pp. 46–45; 1998.

* cited by examiner

Primary Examiner—Charles T. Jordan
Assistant Examiner—Elizabeth Shaw
(74) Attorney, Agent, or Firm—Bacon & Thomas, PL

(57) ABSTRACT

A system, apparatus, and method for underwater self-contained and remotely controllable tagging of marine fauna involves emplacement of a tagging unit that can be used for example in a fishing trawl and establishment of communications with the unit through a cable wire that may be conventional. Numerous types of information can be recorded in relation to the tagging, including two- and/or three-dimensional images of the animal, to be used at a later date when the tagged animal is recovered. The method decreases tagging mortality and the biological effects of tagging on the animals, since they are not exposed to temperature and pressure changes, human handling and, at times, anesthesia. The embodiment makes it possible to tag deep-sea species that have never been tagged due to the fact that they would not survive the ambient changes of coming to the water's surface.

26 Claims, 10 Drawing Sheets

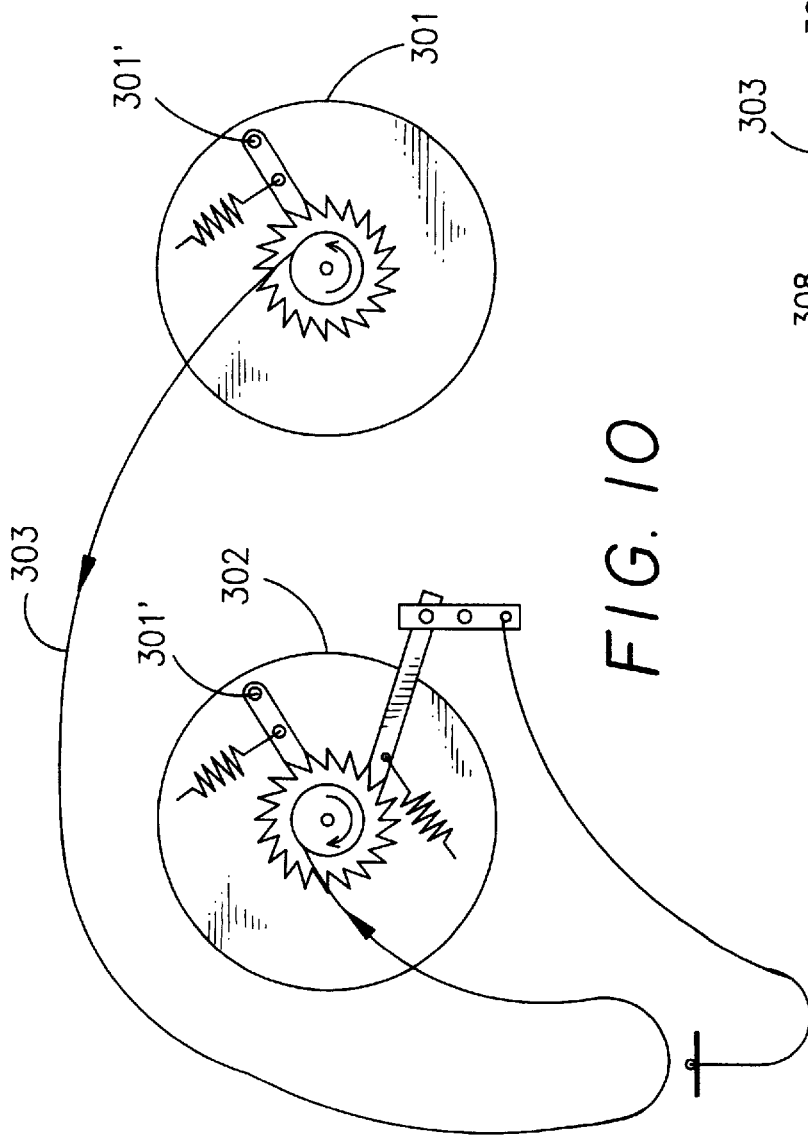
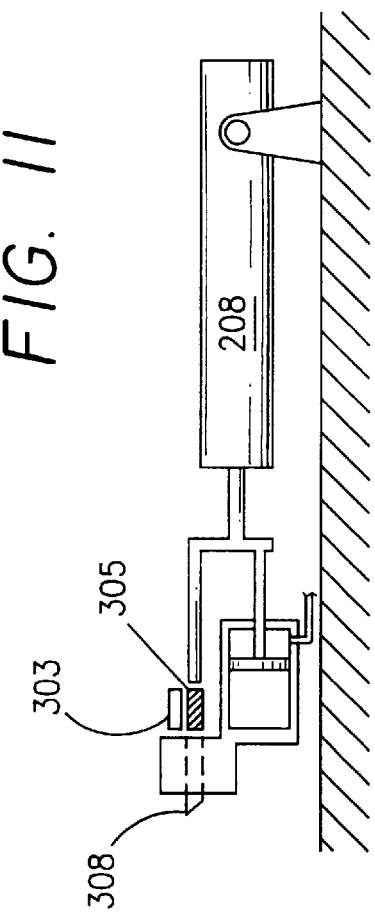
FIG. 10
FIG. 11

SYSTEM, APPARATUS, AND METHOD FOR UNDERWATER TAGGING OF MARINE FAUNA

BACKGROUND OF THE INVENTION

1. Field of the Invention

This invention relates to the field of stock estimation of underwater resources by underwater tagging of representative animals, and in particular to a method, system, and apparatus that utilizes new and existing equipment for capturing and tagging of marine fauna in their underwater environment.

The invention is intended for use in the environment of a fishing type vessel equipped with a conventional trawl and cable wire, with tagging equipment constructed according to this invention placed in the fishing gear to capture and constrain an aquatic animal and then tag it with, for example, an active electronic tag or a tag identified by a number (ID-number). Utilizing existing equipment reduces the complexity of equipment used to establish underwater tagging. Yet, it still provides an advanced and economic method for tagging, as well as money-saving communications capabilities between the vessel and the tagging equipment via the transfer of video and control signals to and from the tagging equipment. Thus, the status of moveable items can be visualized, and measured data transferred.

2. Description of Related Art

In order to better estimate the condition of underwater resources, including sea, ocean, and freshwater fauna, it is of vital importance to tag these animals, and thereby track migration and distribution patterns, particularly in relation to environmental conditions. The environmental conditions that influence an animal's migration patterns or behavior are important parameters in modeling and/or simulation of underwater resources, and study of the animal's reactions to these parameters is critical if future resource estimation is to be improved.

Tagging marine fauna in its own natural environment decreases the influence of the tagging on the animal and increases the survival rate of the animals.

Tagging underwater fauna in its own natural environment makes it possible to tag deep-sea species that it would be impossible to tag otherwise, since such species could not survive being surfaced for tagging by conventional methods.

Tagging has been performed for many years by catching marine fauna and surfacing them, where these animals are anaesthetized, tagged with a tag bearing information, observed and released. The survival capability of these tagged fish is influenced by a number of parameters such as temperature changes, pressure changes, handling, medical treatment, and, after a successfully tagged subject has been released, exposure to temperature and pressure changes once again. The treatment is, in itself, a disturbance to the animal, and the fish could well become an easy prey for other marine fauna after being released.

Tagging also has been performed underwater at depths where marine fauna are located, but these systems usually involve the use of a trap to capture the animal while a diver positioned adjacent the trap performs a tagging procedure. Obviously, the necessary presence of a diver results in relatively high costs associated with the tagging procedure and the number of animals that can be tagged is limited by the rate at which the divers can perform the tagging procedure as well as the available time for each diver to perform the procedure at the depths where the animals have been trapped.

There are many species today that, because of their lifestyle, cannot be tagged by conventional methods. One of these is the highly commercially important species of redfish, *Sebastes marinus*. The redfish is classified as a pelagic or bottom fish, and because of its physiological make-up, it cannot compensate for the pressure change when taken from its natural habitat (300 to 800 meters) in water to the atmospheric pressure of air. Because of this, the redfish has never been tagged and therefore there are many questions unanswered concerning its general biological behavior. This problem exists with other deep-sea species as well and, even if the fish can tolerate the pressure difference, the released, tagged fish is not necessarily healthy and its normal life expectancy cannot be relied on.

SUMMARY OF THE INVENTION

It is accordingly an objective of the invention to provide a method, system, and apparatus for performing the underwater tagging of animals, with necessary precision, while still being relatively low-cost and practical to implement.

It is a further objective of the invention to provide an underwater tagging system which uses identification or information tags, either electronically active or passive, that can be fitted on a variety of different types of underwater animals, including relatively small species and young animals. This system would not only associate a particular identification and information tag with established positions, but would be capable of recording additional parameters, such as environmental conditions.

These objectives can be achieved, in accordance with the principles of the invention, by providing a system, apparatus, and method for performing the underwater tagging of marine fauna, in which the tagging equipment placed in the fishing gear communicates with a control unit on-board the vessel from which the tagging of the fish is controlled. The time of the tagging and the geographical position of the animal are known. This method also includes data on the depth at which tagging occurs and gives researchers the ability to further analyze data in relation to the natural environment of the fish, establishing a three-dimensional spectrum of the fish's natural habitat. The tagging of the animal is observed on one or more video cameras, giving the researcher the ability to observe the tagged fish in two or three dimensions. After the tagging, an image, either two or three dimensional, is saved for that particular subject with the fish's length, height, and width recorded and visual marks measured which give the metric dimensions for the fish's outline. Thus, the subject's body weight can be estimated. Recovered data from the tagging will, at a later date when the fish is recovered, be compared with the actual animal.

Using an especially preferred embodiment of the invention, the tagging equipment placed in the fishing gear includes sensors for measuring environmental parameters, for association and storage, together with digitized images of the animal, GPS coordinates and time of the tagging, so that behavior of the animal can be studied with respect to the stored parameters, while the vessel carries the position-determining transceiver to which the data is linked. The exemplary embodiment described herein includes a vessel, wire connection to the tagging equipment, tagging equipment, fishing gear, communication units, controlled robot arms, video cameras, light projectors, computers in the tagging system as well as in the vessel, electronic devices for magnification and line buffering of video signals and for compensation of the cable attenuation, amplifiers and line buffering of computer communications signals.

BRIEF DESCRIPTION OF THE DRAWINGS

FIG. 10 is a schematic view of an arrangement for keeping strain on the belt on the reel, changing the strain, and limiting movements to a forward direction.

FIG. 11 is a schematic view of an arrangement for cutting a hole in the animal's skin and for pressing a tag into the opening.

DETAILED DESCRIPTION OF THE PREFERRED EMBODIMENTS

Figure 1:
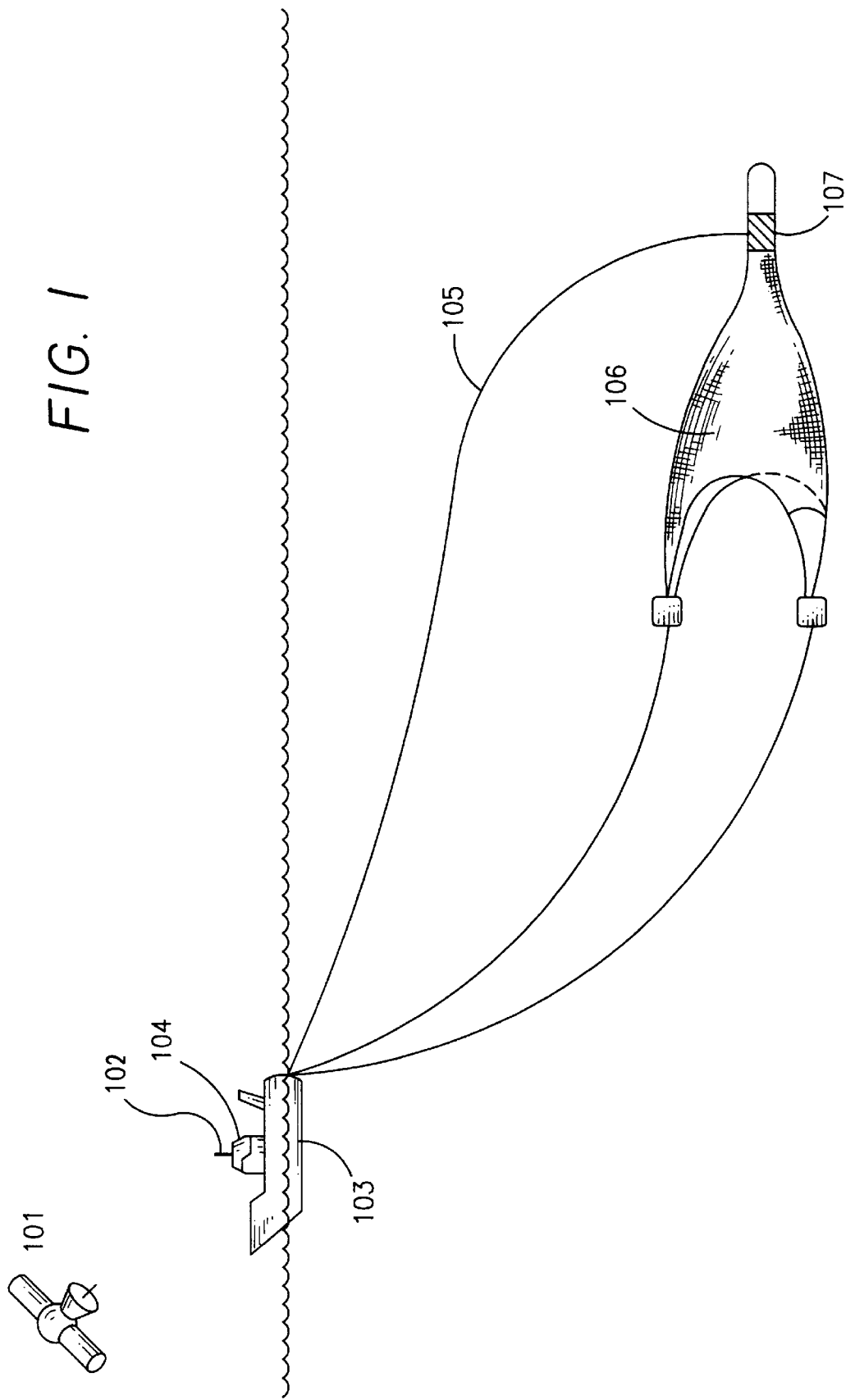
FIG. 1 is a schematic view of the principal components of an underwater tagging system constructed in accordance with the principles of a preferred embodiment of the invention.

In general, the invention involves a system, apparatus, and method for underwater tagging of marine fauna, wherein equipment placed in fishing gear, for example, a trawl, communicates with a Base or Central Station placed on a fishing vessel or other surface floating unit such as a buoy. A marine animal is trapped by the fishing gear, then transferred through the tagging equipment, while being viewed by the Base Station via video. The animal is tagged, and information related to the tagging, such as images of the animal, tag ID number, water depth, temperature, light and salinity, is stored in a digital form associated with the identity of the tagged animal. This information can be recalled and compared with the tagged animal upon the recovery of the animal. In section one below a preferred embodiment of the system and apparatus will be described in connection with FIGS. 1 to 4, and in section two below methods for using the preferred system and apparatus are described in connection with FIGS. 5 to 9.

1. System and Apparatus

FIGS. 1 to 5 schematically illustrate the principal components of a system for performing underwater tagging of marine fauna in accordance with the principles of a preferred embodiment of the invention, including a GPS receiver (102) capable of receiving and decoding positioning signals from a remote source (101), such as a satellite. A tagging system (107) is attached to a trawl (106) and is capable of communicating with the Base Station (104) in vessel (103) through a wire or cable (105) or sonic or acoustic communicator. Vessel (103) could be a buoy, for example, as well, provided with needed equipment.

One of the basic principles of the invention is to associate an individual animal with a particular tag. These animals are tagged underwater in their environment and their tag will be associated with the geographic position of the tagging, images of the tagged animal in two- or three-dimensional form, and measured environmental parameters taken at the tagging site.

A part of the tagging embodiment is a position-determining device which includes a known receiver capable of receiving arbitrary signal frames from any of a variety of geographic positioning systems currently available, including the Global Positioning System (GPS), the Differential Global Positioning System (DGPS), the Global Navigation Satellite System (GNSS), the Russian Positioning Satellite System (GLO-NASS), and Long Range Navigation (LORAN), as well as decoder circuitry capable of determining a geographic position based on the received arbitrary signal frames. The known position-determining device may either be a separate unit, connected to the Base Station, or part of the navigation system of a vessel.

It should also be understood that in addition to the above-mentioned currently available navigation systems, the principles of the invention may also be applicable to proposed navigation augmentation systems such as the wide-area augmentation system (WAAS), the multi-function transport satellite (MTSAT), and the European Geostationary Navigation Overlay Service (EGNOS).

Figure 2:
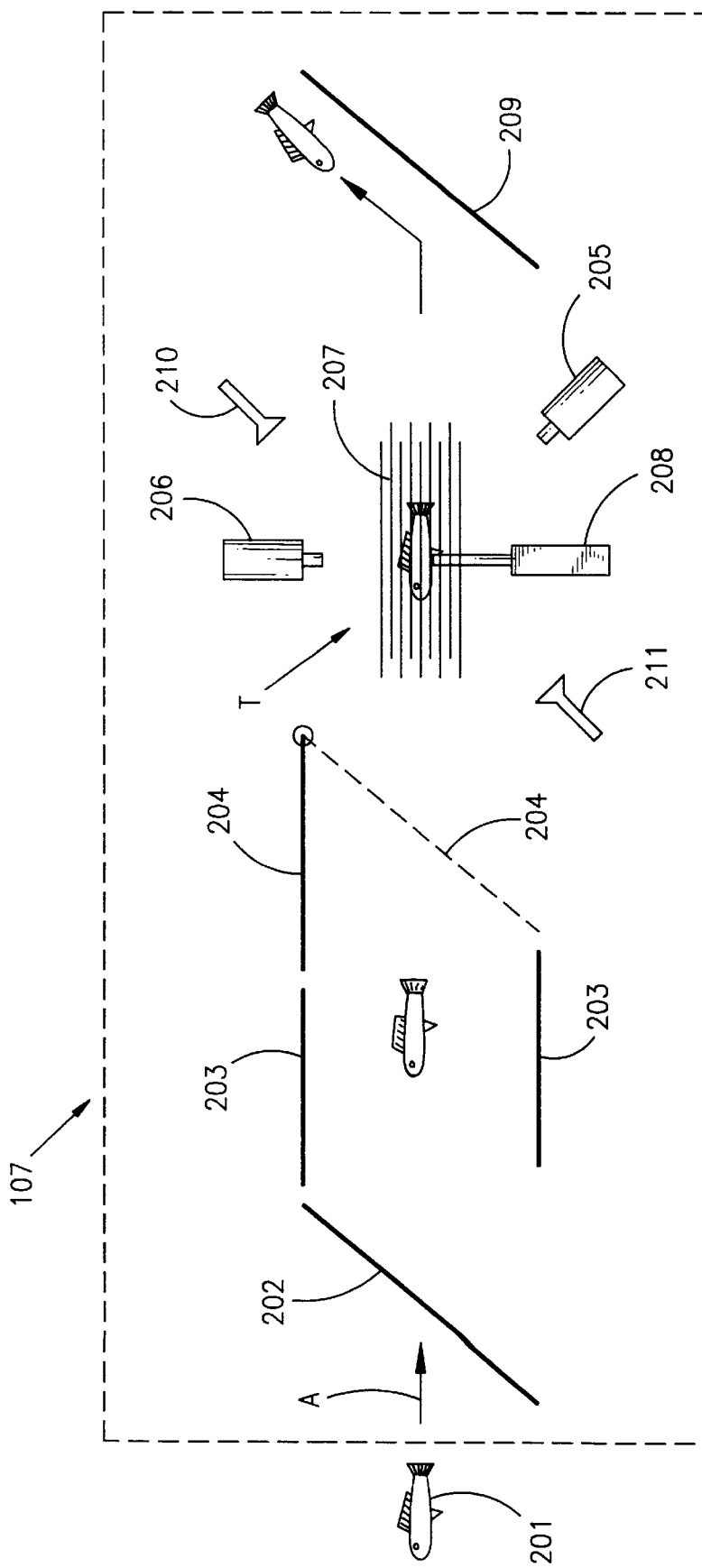
FIG. 2 is a schematic view of an arrangement for selecting, positioning and tagging marine fauna.

In general, the system and apparatus illustrated in FIGS. 1 and 2 use established technologies to implement the principles of the invention. GPS and other embodiments are well-known and commercially available. The fishing gear, and cable wire that are mounted on the vessel and are used to transmit data are also widely available, while modulation of the data is a matter of routine electronic circuitry and software programming. Of course, it would be possible within the scope of the invention to custom-design the tagging equipment in accordance with the users' applications for specific species.

Figure 3A:
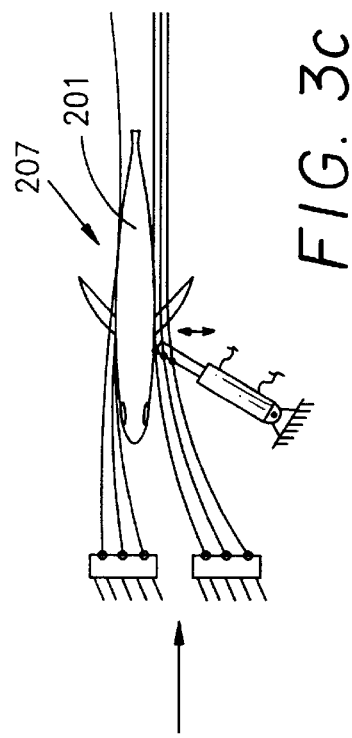
FIG. 3a is a schematic view of an arrangement for remote and/or automatic tagging of marine fauna.
Figure 3B:
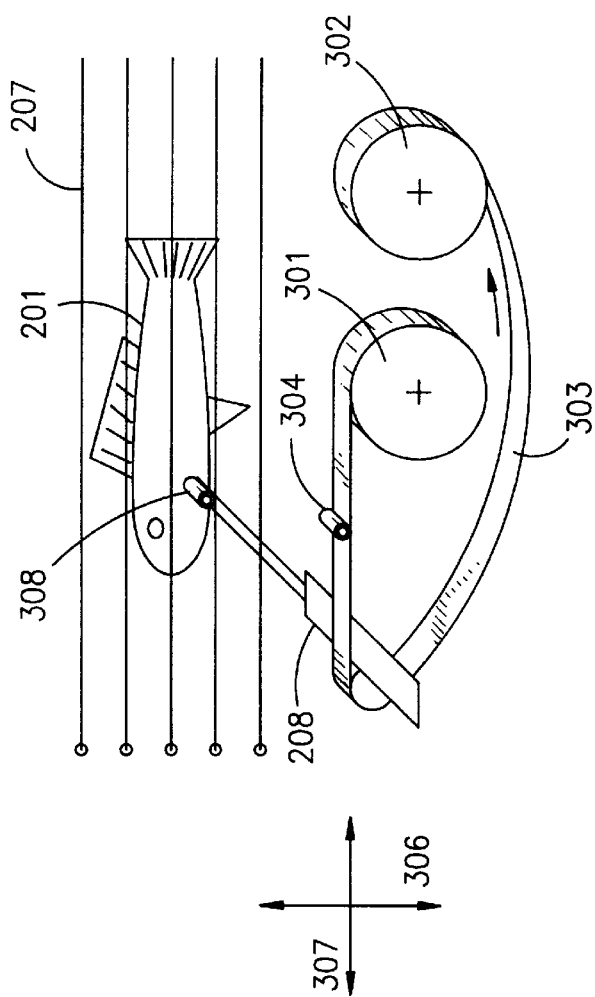
FIG. 3b schematically shows a belt and tag carrier.
Figure 3C:
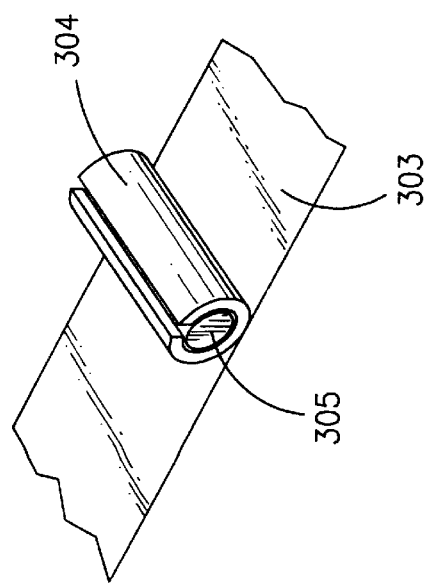
FIG. 3c schematically illustrates a gate for immobilizing fish during tagging.

The principle of the tagging embodiment illustrated in FIG. 2. Large fish are sorted from the tagging unit (107) that is carried by an appropriate structural platform or framework suitable for underwater applications by an adjustable forward grid (202), while fish of the right size and smaller are permitted to pass toward the tagging unit. The arrow A denotes relative motion between fish and tagging unit. Another grid (203) allows smaller fish to leave the unit so that fish of the preferred size reach the tagging site T. A releasable gate (207) schematically shown in FIG. 3c is closed in order to trap fish in a grid constraint that does not injure fish, but only temporarily immobilizes them, as shown in FIG. 3a. When it can be seen by video (206) that fish are trapped, another gate (204) is closed during tagging so that other fauna do not disturb the fish in the tagging fixture. The trapped fish are viewed by at least one video camera (206), with the use of lights (210), from different angles. One camera (205) gives the viewer the ability to view the fish in two dimensions, while adding cameras gives one the possibility of viewing the fish in three dimensions. These pictures are processed and stored. If the fish's shape (height, length and width) is known, the fish's weight can be closely estimated. This is possible because the camera uses points close to the fish to calibrate all dimensional measurements.

Figure 5:
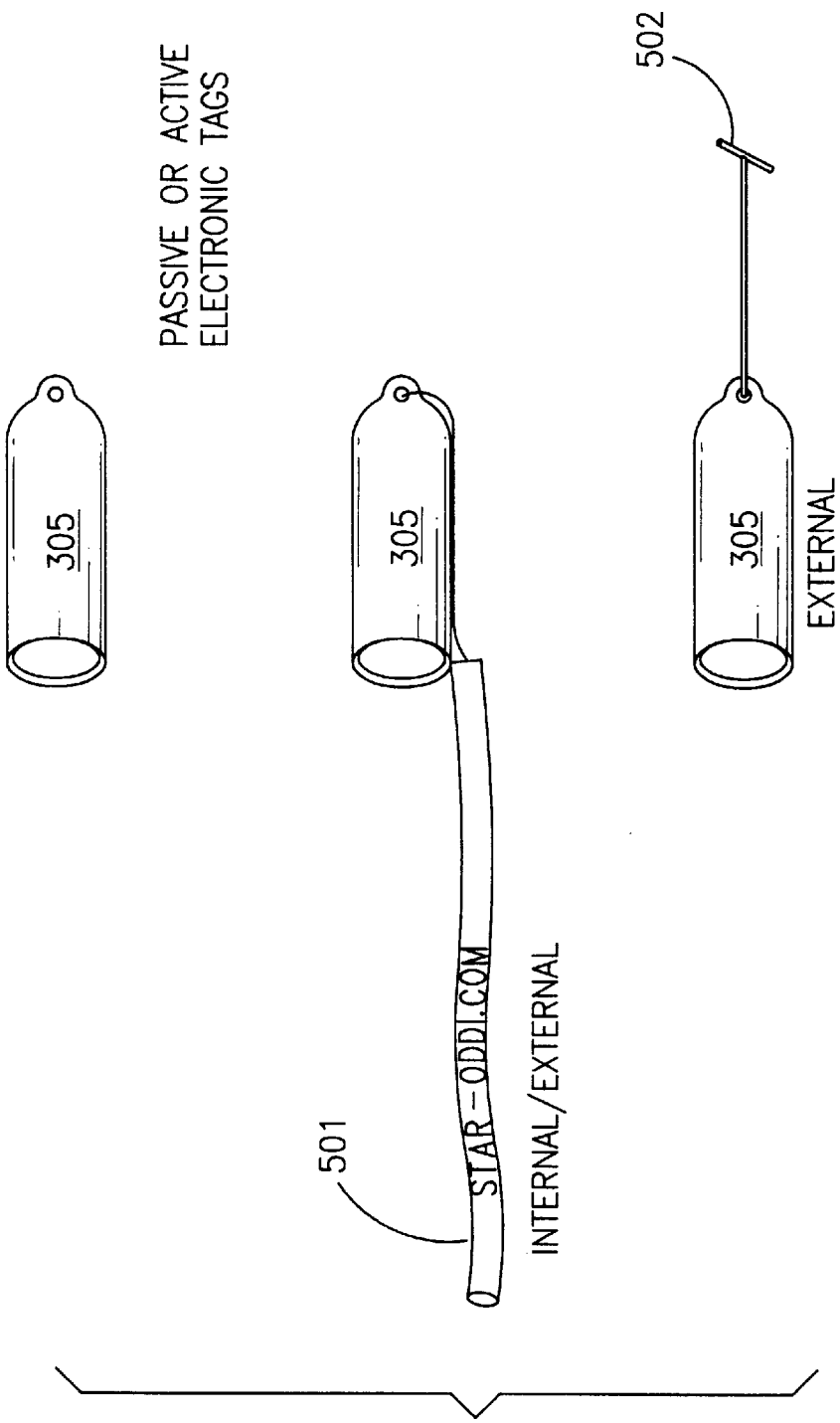
FIG. 5 is an isometric representation of different tags that may be used with the tagging system of the invention.
Figure 6:
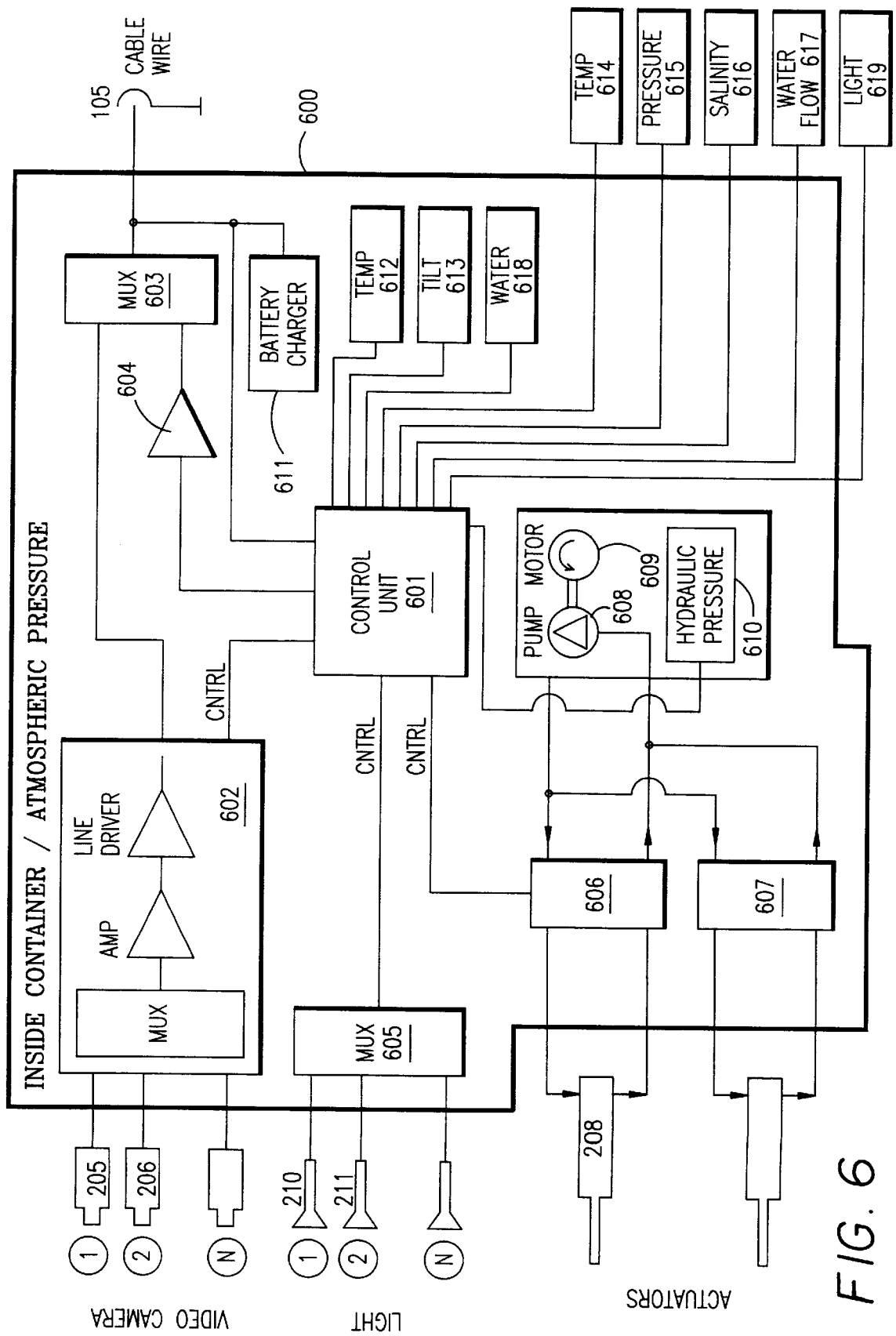
FIG. 6 is a schematic diagram of an arrangement for the measurement and control of moveable actuators, transmitting and receiving data at the underwater tagging embodiment of the invention.
Figure 7:
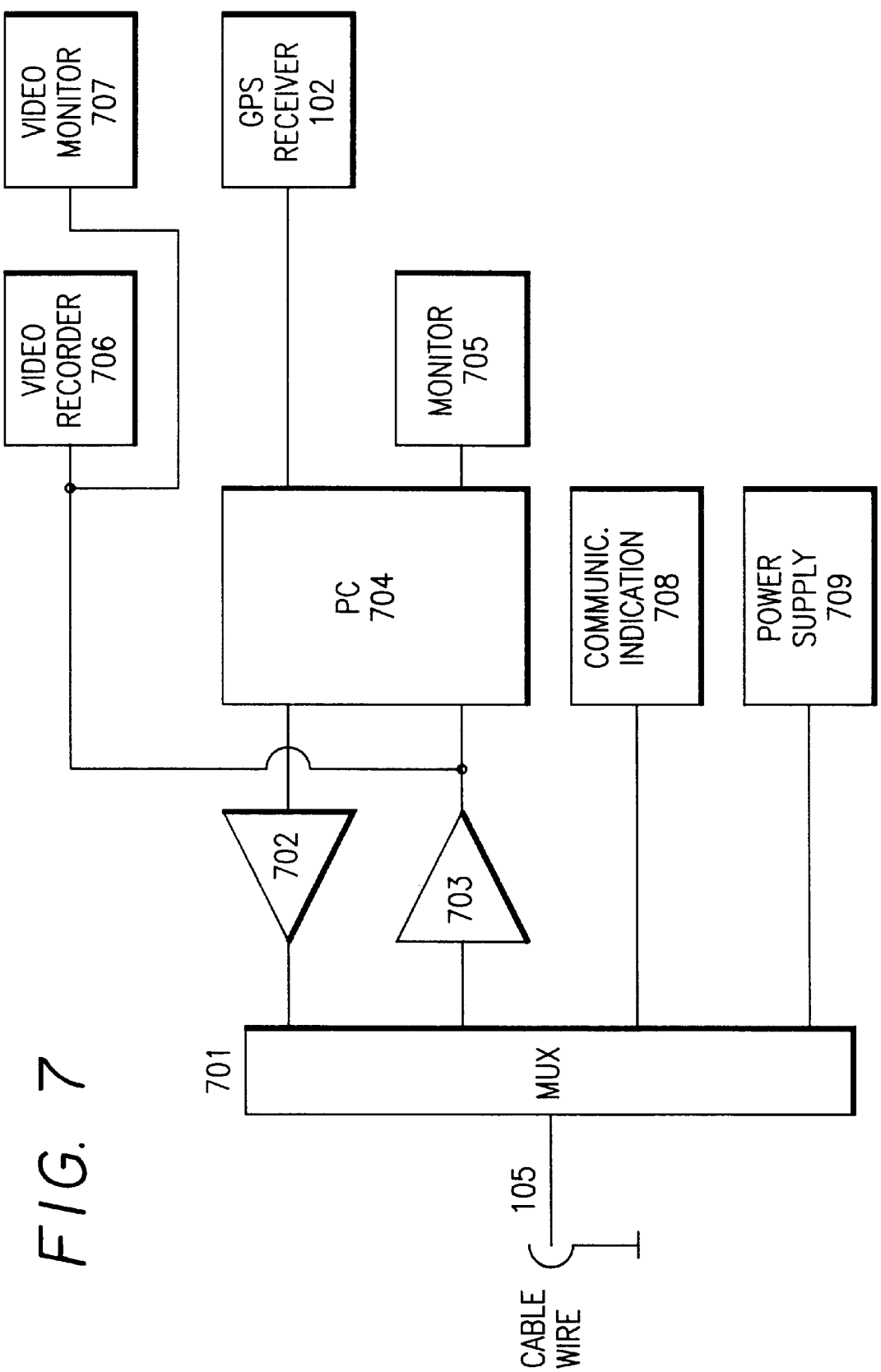
FIG. 7 is a schematic diagram of an arrangement for the transmission and reception of data at the Base Station of the embodiment of the invention.

A cutter and tag driver actuator (208) pushes a cutter knife (308) forward with a tag (305—see FIG. 11). The knife cuts a hole in the fish's skin and the information tag is then pushed into the fish through the hole by the tag driver. The tag can be placed in the fish's body cavity, muscle or elsewhere. Suitable tags (305), such as passive and/or active electronic tags, and programmable tags for the tagging equipment are available from Star-Oddi of Iceland. These presently include tag models DST200, DST300, DST400 and DST 500. Examples of such tags are shown in FIGS. 3b and 5, where a tag with no external ID is used since the tag ID is on or inside the tag housing. Tags used can be passive and/or active electronic tags in which the electronic component saves the ID information and other measured and stored data from the field. Active electronic tags with no external ID-number can be found easily by a metal detector or by remote communication with the tag from a short distance. A tag which transmits radio frequency pulses can be located at a distance of up to a few kilometers. A passive tag activated by RF power can be detected up to a few hundred meters, where the tag detects the presence of an RF (radio frequency) field and responds by transmitting RF pulses in response. For a tag that has no integrated battery power, communication at a distance of a few meters can be obtained by activating the tag through the RF field and generating DC voltage within the tag in order to power it. One can also use a tag equipped with a tube (501). These tubes, which are of various colors, and can have an ID and other text printed on them, are used for external identification. For example, a tag can be implanted in a fish's body cavity while the tube remains on the fish's exterior for visual identification. Another type of tag equipped with an anchor (502) can be used for fastening the tag to the fish, with the anchor attached inside the fish, and the fish dragging the tag externally. Existing tags include two small, tooled projections (not shown) for attachment to the fish at a position, for example, parallel to the back fin.

Tags are available in a number of sizes; for example, active electronic tags are available as small as 7 mm in diameter and 13 mm in length. Passive tags are available in the same sizes and can easily be constructed in smaller sizes. The size of the tag depends on, for example, the number and type of sensors, performance, memory size, lifetime, and other parameters.

The principal drawing depicting the operation of the tagging gun is shown in FIGS. 3a and 3c in which a fish has been trapped and is constrained in a grid of gate (207) and is ready to be tagged. The tag driver (208) is moved horizontally (306) and/or vertically (307) to the tagging point on the fish by suitable remotely controlled actuators (not illustrated). When the gun is in place, tagging is carried out by actuating the gun. When the gun returns to its zero position, a new tag is reloaded from a supply reel or magazine (301) that contains a number of tags ready to be loaded into the gun. Empty magazines (304) are returned to a take-up reel (302) as well. By way of example, the magazines are fastened to a movable belt (303) which brings the tags forward to the tagging gun as shown in FIG. 3b. The gun may be actuated hydraulically for example, in the manner of a nail driver, or by other energizing sources (electric, pneumatic, etc.).

At all times, a mechanism as shown in FIG. 10 maintains tension on the belt (303) as well as on the take-up reel (302) that receives empty magazines after the tagging. The tension on the belt is changed each time the gun moves forward and back. A detent mechanism (301') keeps the reels from rotating the wrong way and limits their movement to a forward direction.

The gun also includes a cutting device (308) shown in FIG. 11 which cuts a hole in the animal's skin when the gun is pushed forward with a tag. The depth of the cut hole can be controlled and adjusted via the equipment. After the hole has been cut, the tag is automatically pushed forward, using the water inside and around the system as a shock-absorber damping movements. In this way, it is possible to have the same actuator performing more than one task in the same movement(e.g., the operation depicted in FIG. 11).

Figure 4:
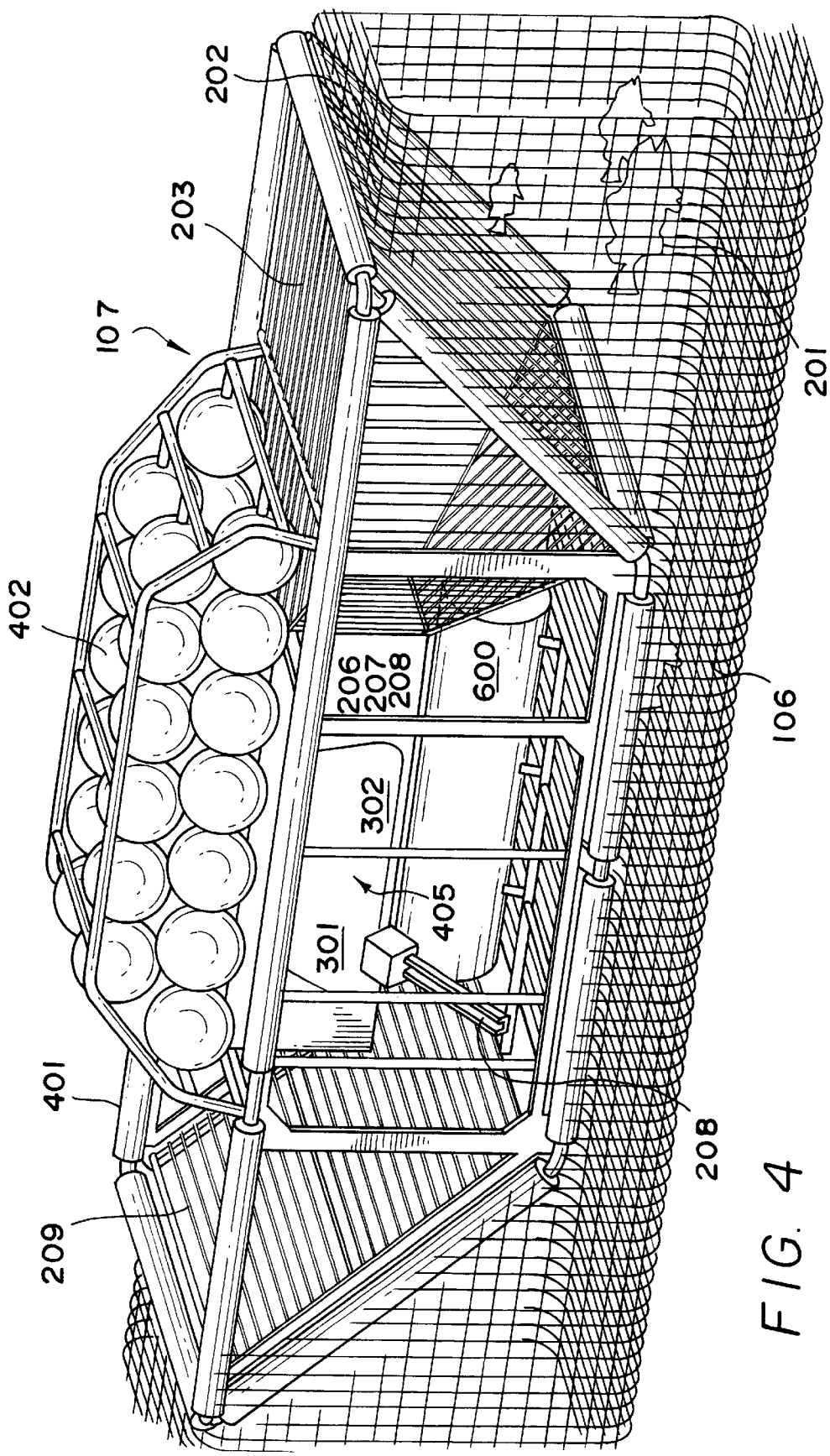
FIG. 4 is an isometric representation of the tagging embodiment for use with the tagging system illustrated in FIGS. 1, 2 and 3.

FIG. 4 shows the actual shape of an embodiment of the tagging unit in which floatation devices (402) are placed on the top of the unit, and rubber tubes (401) are used for protection of the framework (107). The placement of different items of the invention is selected to obtain the best possible buoyancy and stability in water for the equipment. The center of gravity is placed as low as possible. The locations of the gate (207), tagging gun (208) and video (206), for example, are illustrated as located at a central area (405).

After the tagging has been performed, the gate (207) is opened and closed again ready for trapping the next fish, while the gate (204) is opened.

Upon recovery of the tag, by capture of the animal, data and images from the tagging will be compared with recovery data gathered from the tagged subject. Information such as geographical position of the recovery site, environmental parameters, animal external dimensions, shape and visual parameters, such as injuries and/or marine fauna on the animal at recapture, will be included.

2. Method

The method of the invention includes several embodiments:

(i) Base Station

The Base Station is the controlling unit in the system where decision-making is carried out. At the Base Station, the activity of the tagging unit may be viewed by viewing the incoming video signals and the actuators placed at different points in the tagging unit may be remotely actuated.

A standard PC (704) is a basic unit in the construction. It works with controls and broadcasts the video signals recovered from the tagging unit on a PC monitor (705). This gives the researcher or scientist a tool for decision making.

The researcher makes a decision on the PC keyboard/mouse. The PC sends a communication indication (708) to the cable wire, which sets the controlling unit (601) in the tagging unit into a receiving mode. The command signal is thereafter buffered (702) and transmitted to the cable wire to be received by the tagging unit. The PC knows if a return signal from the tagging unit is expected and waits for such a reply if required.

The method as described assumes only two wires are available in the cable wire. The construction may be simpler when more wires in the cable wire are available.

The MUX (701) is a multiplexer and switches to different lines according to the PC controlling unit. All video images received by the Base Station can be viewed on a video monitor (707) and can also be recorded (706).

The power supply unit (709) acts in such a way that it supplies voltage via the cable wire to the tagging unit so that it can charge its batteries on-line and thereby extend the lifetime of the batteries placed in the tagging unit.

(ii) Tagging Unit

The tagging unit comprises mechanical parts and electronic devices, some of which are placed in a sealed container (600) that is kept at a certain atmospheric pressure while other parts, such as actuators, experience the environmental pressure that occurs at the depth at which equipment is operating.

The Control Unit (601) is programmed according to performance required and communicates through the cable wire (105) with the Base Station. Signals transmitted from the Control Unit are buffered with an amplifier that can drive high capacity loads from the cable wire. This is the same solution as used in the Base Station (702) buffered (604) with the line driver.

When video cameras are used, the video signal is amplified and buffered (602) before reaching the cable wire. The multiplexer (603) switches the signals to the cable wire. Using one camera on the object gives a two-dimensional view, while the use of two cameras gives an approximation of a three-dimensional view. The more video cameras that are used, the more precise of a three-dimensional image will be obtained.

The Control Unit controls, and turns on/off lights according to the commands of the Base Station through the multiplexer (605).

Charging of batteries (611) is performed in two ways. First, there is a connector to the container (600) that experiences controlled atmospheric pressure. A charger can be connected here and the charging current selected can be high, in tenths of amperes. Second, charging can take place through the cable wire. Here, however, the current flowing through the wire has to be limited according to the cable's construction, wire length and thickness.

Multiple sensor measurements are taken and measured data is transmitted to the Base Station.

The Controlling Unit selects actuators (208)/(211) and runs them by use of a hydraulic system. A motor (609) powers a hydraulic pump (608) that generates the required hydraulic pressure for the actuators. The hydraulic switches (606), (607) are controlled and opened/closed by the Control Unit. Opening a hydraulic switch activates an actuator while the Controlling Unit determines movement and speed of the actuator. Other actuators are controlled in exactly the same manner and so are not shown in the schematic diagram. The hydraulic pressure is measured (610) digitally so that the performance of the device can be monitored and controlled from the Base Station at any time.

Figure 8:
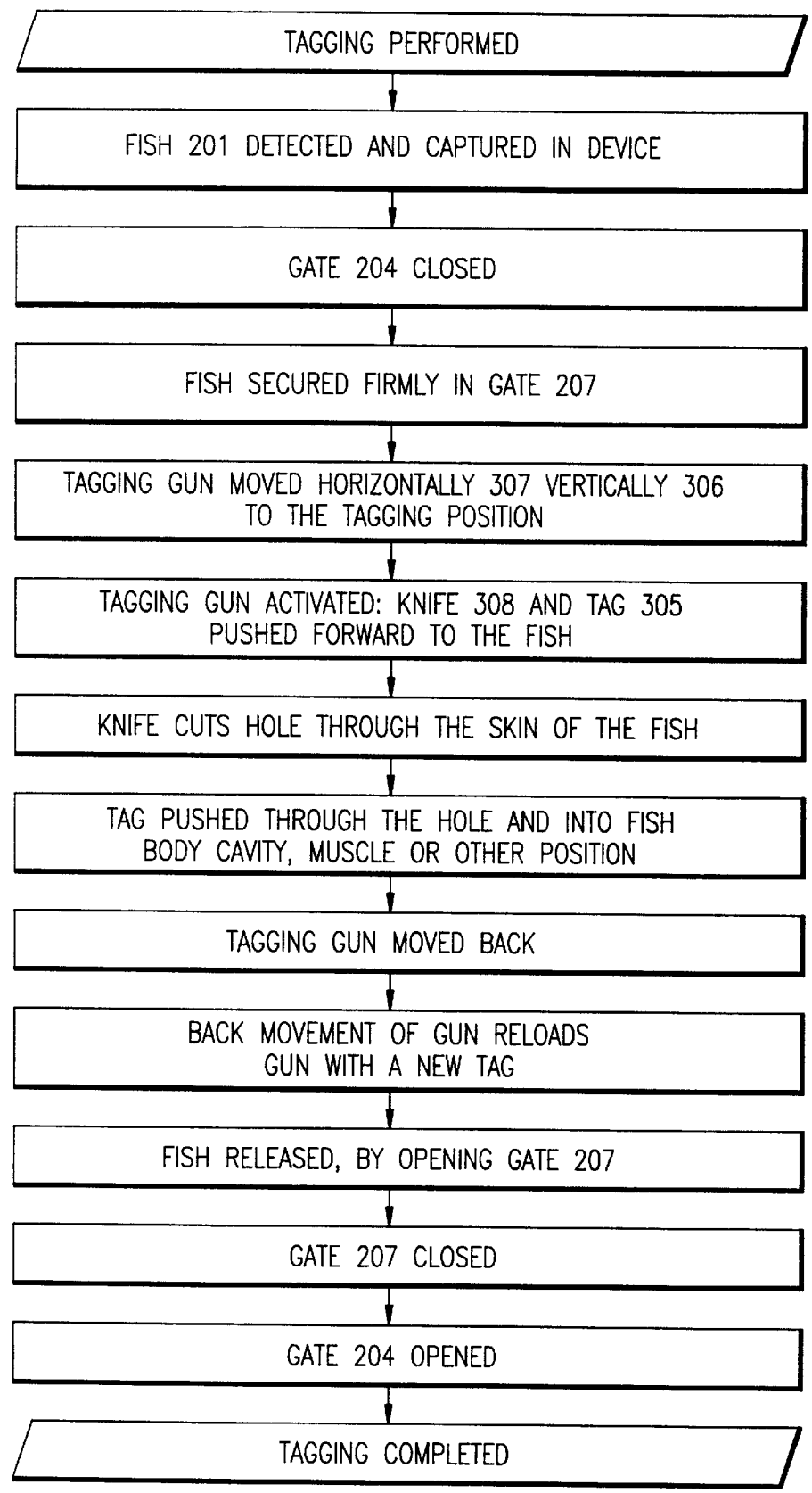
FIG. 8 is a flow-chart illustrating a successful tagging in accordance with a preferred embodiment of the invention.

A flow chart describing successful tagging procedure is shown in FIG. 8.

The tagging unit includes a container (600) that can withstand pressure as high as 600 bar (6000 meters) thus tagging equipment can be utilized to a depth of approximately 6000 meters.

(iii) Communication

Communication can be carried out in different ways depending on the communication link used. The equipment is prepared for different approaches to communication, depending on the available link:

a. The invention may use two-wire communication where it is possible to transmit and receive multiple data, including video signals, on the same cable. This is a so-called simplex communication system.

b. The invention may use a cable wire having more than two wires. This makes it possible to transmit video signals continuously, from more than one camera at the same time, and to transmit and receive communication at both ends of the wire simultaneously. This is a full duplex system.

Such a duplex system can also be obtained by communicating on RF (Radio Frequencies) signals where transmission and reception of data communication signals, as well as signals from various video cameras, can be on different frequencies. The limitation of such a system is that the cable wire performance at very high frequencies is poor. This means that the RF communications should be on as low frequencies as possible with a necessary frequency separation so that disturbances will not occur. The RF method used is a closed communication system. Requirements demanded by authorities in order for such a system to be approved are easily met.

c. Transmitting video signals through an acoustic link is not a feasible choice since the speed in such communication is limited. Digital communication could be obtained by using the sonic transceivers on vessels and implanting a sonic transceiver in the tagging embodiment. Such an arrangement would increase the complexity of the system.

d. There are cables available which have an integrated light conductor (optical cable). If such an arrangement were available in cable wires on-board vessels then all communication, as well as signals from unlimited numbers of video cameras, could be transmitted via the cable simultaneously. Such an arrangement would increase the complexity of the system slightly, but would make it much more efficient for the user. The only disadvantage is that light conductors can be damaged by bending and stretching which makes the construction of the invention more difficult.

(iv) Viewing the Tagged Marine Fauna

The tagged animal is viewed by one, two or more video cameras and a digital version of the image is stored at the Base Station on disc or tape.

By using one camera (205), the tagging subject can be viewed, species determined, and all functions preparatory to tagging carried out, while measurements such as length and height of the animal are recorded. Using two video cameras, (205), (206), a third dimension is added to the measurements and shape of the tagged animal. An image of the animal can be processed into a three-dimensional image and saved. This is possible due to the fact that the outline of the tagged animal is known, thus drawing techniques and algorithms, plus knowledge of the species' shape, can be used to fill in the areas not viewed. Using more cameras will improve such an image, but not necessarily to the point that consumers would implement them in their systems.

(v) Multiple Measurements

Multiple measurements are taken at the tagging unit inside the container (600), which is kept at a controlled atmospheric pressure. Measurements are also taken of environmental conditions outside of the container. All of this information is transmitted to the Base Station. Measurements inside the container (600) are of data such as temperature (612), tilt in three directions (613), and water/salinity levels (618) which are used for detecting leakage inside the container (600). Exterior measurements include temperature (614), pressure (615), salinity (616), light (619), and water flow (617). Other measurements can be added according to user-specified requirements.

(vi) Programming the Base Station and the Tagging embodiment

Researchers and scientists who receive the tagging equipment can program it to work in a specific manner in relation to the research that is being performed. For example, programming by the user can be carried out by a man-to-machine graphic interface which is developed and viewed via screen. All system parameters and positions can be viewed while the embodiment described in the invention is functioning. The communication baud speed between the Base Station and the tagging embodiment can be set by the user, as well as movements of all actuators, speed and moveable distance.

(vii) Automatic Taaaing by Machine vision

It is important for the Base Station to be able to identify the shape of the desired animals. One can do this with the tagging equipment and, if the targeted animal is lying correctly in the tagging equipment, automatic tagging of the animal can be implemented. With this method, species in the tagging equipment are recognized, tagging guns are moved to the spot selected for tag placement and a decision is made concerning when to tag the animal. The procedure is exactly the same as described previously, but the Base Station includes an automatic decision-maker. The viewing and identifying of the animal can be carried out by a two- or three-dimensional system. Size can be used as a selection parameter, where animals outside the preset criteria are released without being tagged.

(viii) Placement of the Tag

Tags can be placed in numerous places on/in the fish depending on the type of tag attachment and identification. For example, tags can be placed in the body cavity or a muscle with or without external identification (501), which is in the form of identification tubes leading to the exterior. The tag can also be placed on the exterior where the tag is fastened to the animal using holes on the tag. The tag can also hang loose on the animal using a fastening arrangement (502) attached to the fish's exterior, in its body cavity or muscle, or through the fish. There is also a fastening arrangement available which is formed like a button and fits nicely on flat fish.

(iv) Storage and Image Processing

Data, gathered from and at the tagging, related to the tagged animal are all stored on a disc or other media storage system (magnetic tape) ready to be recalled at the recovery of the tagged animal. Storage is indexed in relation to the ID number of individually tagged animals and two- or three-dimensional images of the animal can be recalled along with the geological position, and time at which the tagging took place, as well as environmental parameters such as tagging depth and environmental temperature.

Managers of the resources will wish to use and compare data collected from both tagging and recapture, and to look at their relation to the behavior, migration routes and distribution of the species. Growth and health of the animal, and visual inspection of the fish is also important to the researchers.

In order that the computer may perform much of the work, making the researchers' job easier, all data on the animals and tagging information is in digital form. Image processing can be used and the scientist can thus primarily spend his time analyzing results such as weight distribution, size, etc. Even if an active electronic tag is used, results can be compared to profiles of temperature that the fish experienced at tagging, as well as positional information.

Figure 9:
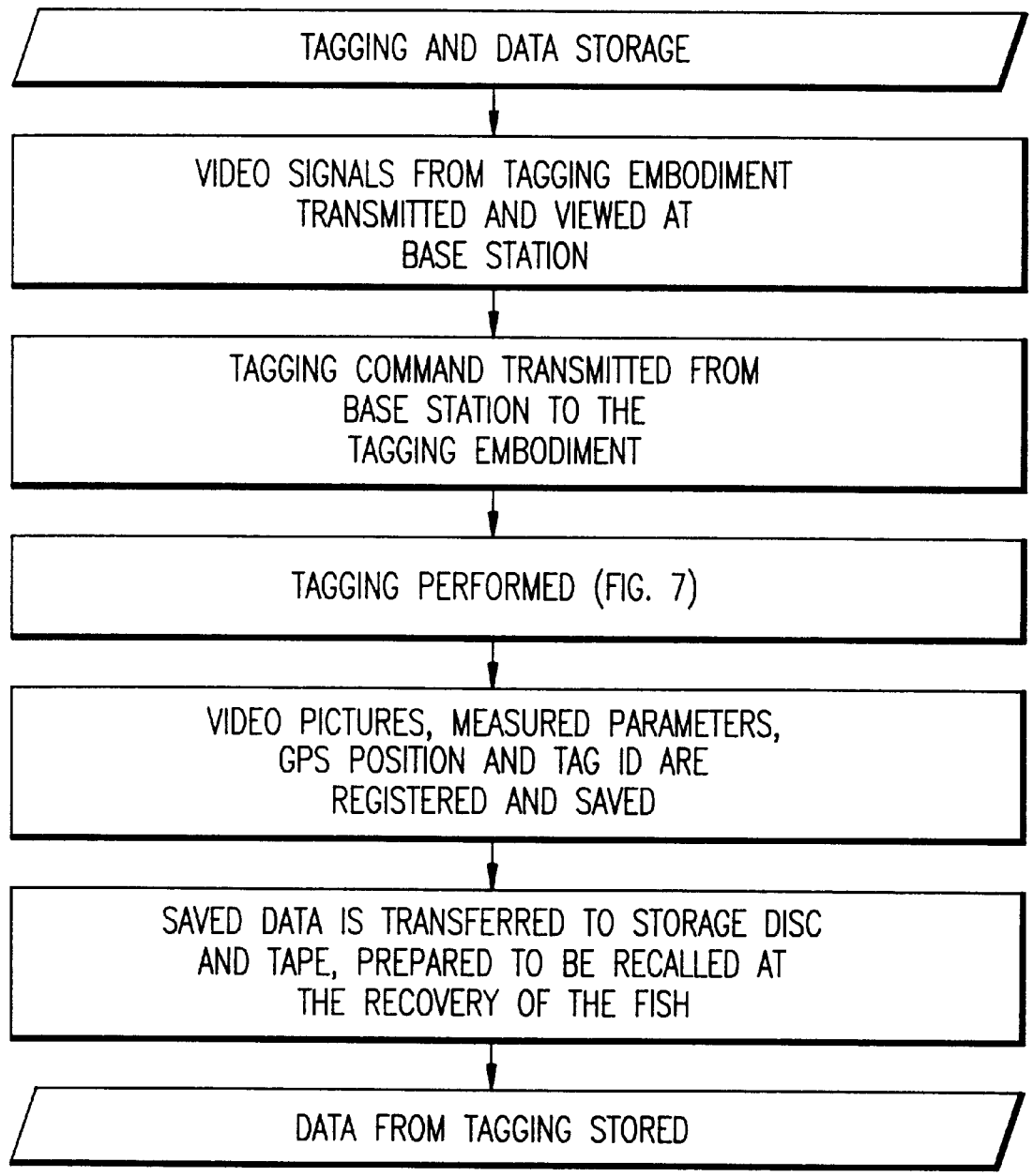
FIG. 9 is a flow-chart illustrating a successful tagging and data storage for a tagging in accordance with the preferred embodiment of the invention.

A flow chart for the storage of information is shown in FIG. 9.

Having thus described a preferred embodiment of the invention with sufficient particularity to enable those in related fields to easily make and use the invention, and having described several possible variations and modifications of the preferred embodiment, it should nevertheless be noted that still further variations and modifications of the invention are possible, and that all such variations and modifications should be considered to be within the scope of the invention. For example, the invention could possibly be placed in a trap for tagging animals such as tuna or other species, manually or automatically. Also, the invention could be used without a tagging unit to constrain aquatic animals temporarily in their environment while the video camera(s) view the constrained animals and transmit video signals to the base station for processing. Accordingly, the scope of the invention should not be limited by the above description, but rather should be interpreted solely in accordance with the appended claims.

I claim:

1. An aquatic animal tagging system comprising:
   a support framework;
   an underwater animal movement constrainer carried by the framework having a gate device configured to entrap and temporarily constrain against relative movement a floating living aquatic animal at a predetermined location within the constrainer;
   a tag delivery device carried by the framework located adjacent said predetermined location and movable towards and away from the gate device up to said predetermined location and operable to deliver an information tag to be applied to an aquatic animal;
   a tag delivery device actuator associated with the tag delivery device and arranged to drive the tag delivery device towards the gate device at least up to said predetermined location and to withdraw the tag delivery device from said location; and
   a feed device carried by the framework for supplying an information tag to the tag delivery device for movement therewith.

2. The tagging system as claimed in claim 1, including at least one remote viewing device carried by said framework and located adjacent said predetermined location arranged to output image signals of an aquatic animal constrained in said constrainer and located adjacent said predetermined location; a communication link transmitting said output image signals from said viewing device to a remote location; and a light source carried by said framework for illuminating said predetermined location.

3. The tagging system as claimed in claim 1 or 2, including a remote control system located at a remote location outside said framework and linked by a communication link to said tag delivery device actuator, and operable to control said tag delivery device actuator from said remote location.

4. The tagging system as claimed in claim 3, including a surface vessel and a wire or cable connecting the framework to the vessel, said wire or cable including said communication link and said remote location being located on said vessel.

5. The tagging system as claimed in claim 1 or 2, including a gate device actuator connected to said gate device to move the gate device between aquatic animal constraining and releasing configurations.

6. The tagging system as claimed in claim 5, including a gate device actuator control system located at a location remote from said framework and linked to said gate delivery device, actuator by a communication link, said gate device actuator control system operable to control said gate device actuator from said remote location via said communication link.

7. The tagging system as claimed in claim 2, including a surface vessel and a wire or cable connecting the framework to the vessel, said wire or cable including said communication link and said remote location being located on said vessel.

8. The tagging system as claimed in claim 2, including an electrical memory storage device at said remote location and arranged to receive and store electrical information signals corresponding with said output image signals.

9. The tagging system as claimed in claim 2, including a sealable container carried by the framework, a central control unit located in the container, and at least one energizing link connecting the central control unit to at least said tag delivery device actuator at a location outside said container; and at least one communication link connecting the central control unit to said remote viewing device so that said output image signals may be communicated to said central control unit.

10. The tagging system as claimed in claim 1, including at least one sizing gate carried by the framework at a location in advance of the constrainer, said sizing gate including a grid having spaces dimensioned to exclude the passage of aquatic animals larger than a predetermined size to the constrainer.

11. A tagging system as claimed in claim 1, said feed device including a movable carrier arranged to carry multiple information tags in sequence to said tag delivery device to enable repeated and sequential driving of information tags by said tag delivery device.

12. A tagging system as claimed in claim 11, said carrier including multiple holders arranged to engage and position information tags in series for serial delivery to said tag delivery device.

13. A tagging system as claimed in claim 1, said framework including a flotation device capable of displacing water to control the buoyancy of the framework and all articles carried by the framework.

14. A tagging system as claimed in claim 1, including a cutter element located adjacent said predetermined location, said cutter element movable synchronously with said tag delivery device and located so as to prepare an incision in a constrained animal located at said predetermined location prior to delivery of an information tag to said predetermined location by said tag delivery device; and a cutter actuator arranged to drive said cutter element towards said predetermined location in synchronism with movement of said tag delivery device.

15. The tagging system as claimed in claim 1, including a surface vessel and a wire or cable connecting the framework to the vessel; said wire or cable including a communication link between a vessel and at least one of said tag driver actuator, feed device, and cutter actuator; said communication link arranged to transmit control signals between said vessel and said at least one of said tag delivery device actuator, feed device and cutter actuator.

16. The tagging system as claimed in claim 1, including a sealable container carried by the framework, a central control unit located in the container, and at least one energizing link connecting the central control unit to at least said tag driver actuator at a location outside said container.

17. The tagging system as claimed in claim 16, including at least one container internal environmental parameter sensor located in the container arranged to sense at least one environment parameter within the container.

18. The tagging system according to claim 17, including at least one external parameter sensor located outside said container arranged to sense at least one environment parameter outside said container, and a communication link connecting all said sensors to said central control unit.

19. The tagging system according to claim 17 or 18, including a surface vessel and a wire or cable connecting the framework to the vessel; said wire or cable including a communication link between the vessel and said central control unit.

20. An aquatic animal constraining and viewing device comprising:

a support framework having floatation elements for regulating buoyancy of the framework;

an underwater animal movement constrainer carried by the framework having a gate device configured to entrap and temporarily constrain against relative movement a floating living aquatic animal at a predetermined location within the constrainer;

at least one information tag to be implanted in a marine animal carried by the framework;

a tag delivery device carried by the framework and including a cutter element located adjacent said predetermined location and a tag delivery device actuator movable towards and away from the gate device up to said predetermined location;

a tag delivery device actuator associated with the tag driver and arranged to drive the tag driver towards the gate device at least up to said predetermined location and to withdraw the tag delivery device from said location;

a feed device carried by the framework for supplying said at least one information tag to the tag delivery device for movement therewith;

said cutter element movable synchronously with said tag driver and located so as to prepare an incision in a constrained animal located at said predetermined location prior to driving of an information tag to said predetermined location by said tag delivery device;

a cutter actuator arranged to drive said cutter element towards said predetermined location in synchronism with movement of said tag delivery device;

at least one remote viewing device located adjacent said predetermined location carried by said framework arranged to output image signals of an aquatic animal constrained in said constrainer;

a communication link transmitting said output image signals from said viewing device to a remote location;

a light source operable to illuminate said predetermined location;

a gate device actuator connected to said gate device and operable to move the gate device between aquatic animal constraining and releasing configurations; and a gate device actuator control system located at a location remote from said framework and linked to said gate driver actuator by a communication link, said gate device actuator control system operable to control said gate device actuator from said remote location via said communication link.

21. A method of tagging aquatic animals under water within the environment of the animals comprising the steps of:

mounting an animal constraint on an underwater floatation device;

temporarily trapping and constraining aquatic animals against motion relative to the floatation device while entrapped and within the underwater environment of the aquatic animals;

attaching an information tag to the constrained aquatic animal using a tag delivery system carried by the floatation device; and releasing the aquatic animal from the constraint back to its underwater environment without removing the aquatic animal from the underwater environment in which the aquatic animal was trapped and constrained.

22. The method as claimed in claim 21, including illuminating each aquatic animal while it is constrained;

obtaining a video image of each aquatic animal while it is constrained; and transmitting the video image to a viewing station.

23. The method as claimed in claim 22, including storing the video information in an electronic memory for later processing or review.

24. The method as claimed in claim 21, including towing said floatation device by a surface vessel to move the constraint through the underwater environment of aquatic animals to be constrained to thereby engage and entrap aquatic animals in the constraint while they are in their underwater environment.

25. The method as claimed in claim 24, including controlling the constraint and a tag attaching device remotely from the vessel via a signal link associated with a towing device connecting the vessel to the floatation device.

26. The method as claimed in claim 21, including forming an incision in each constrained aquatic animal and carrying out the step of attaching the information tag to the animal by implanting the information tag in the incision.

* * * * *